United States Patent [19]

Charkey

[11] Patent Number: 5,658,694

[45] Date of Patent: Aug. 19, 1997

[54] SIMPLIFIED ZINC NEGATIVE ELECTRODE WITH MULTIPLE ELECTRODE ASSEMBLIES

[75] Inventor: Allen Charkey, Brookfield, Conn.

[73] Assignee: Energy Research Corporation, Danbury, Conn.

[21] Appl. No.: 721,935

[22] Filed: Sep. 27, 1996

[51] Int. Cl.[6] .................................................. H01M 004/38
[52] U.S. Cl. .................................................. 429/229; 429/245
[58] Field of Search .................................. 429/229, 230, 429/231, 245, 209, 59

[56] References Cited

U.S. PATENT DOCUMENTS

| | | | |
|---|---|---|---|
| 2,987,567 | 6/1961 | Freas et al. | 429/231 X |
| 3,870,564 | 3/1975 | Takamura et al. | 429/231 X |
| 4,084,047 | 4/1978 | Himy et al. | 429/206 |
| 4,292,357 | 9/1981 | Erisman | 429/229 X |

*Primary Examiner*—Anthony Skapars
*Attorney, Agent, or Firm*—Robin, Blecker, Daley & Driscoll

[57] ABSTRACT

A zinc negative electrode comprising first and second zinc electrode assemblies separated by a porous hydrophobic element: Each of the zinc electrode assemblies includes a zinc active element and is devoid of any catalytic material for promoting oxygen gas recombination by the zinc active element.

9 Claims, 1 Drawing Sheet

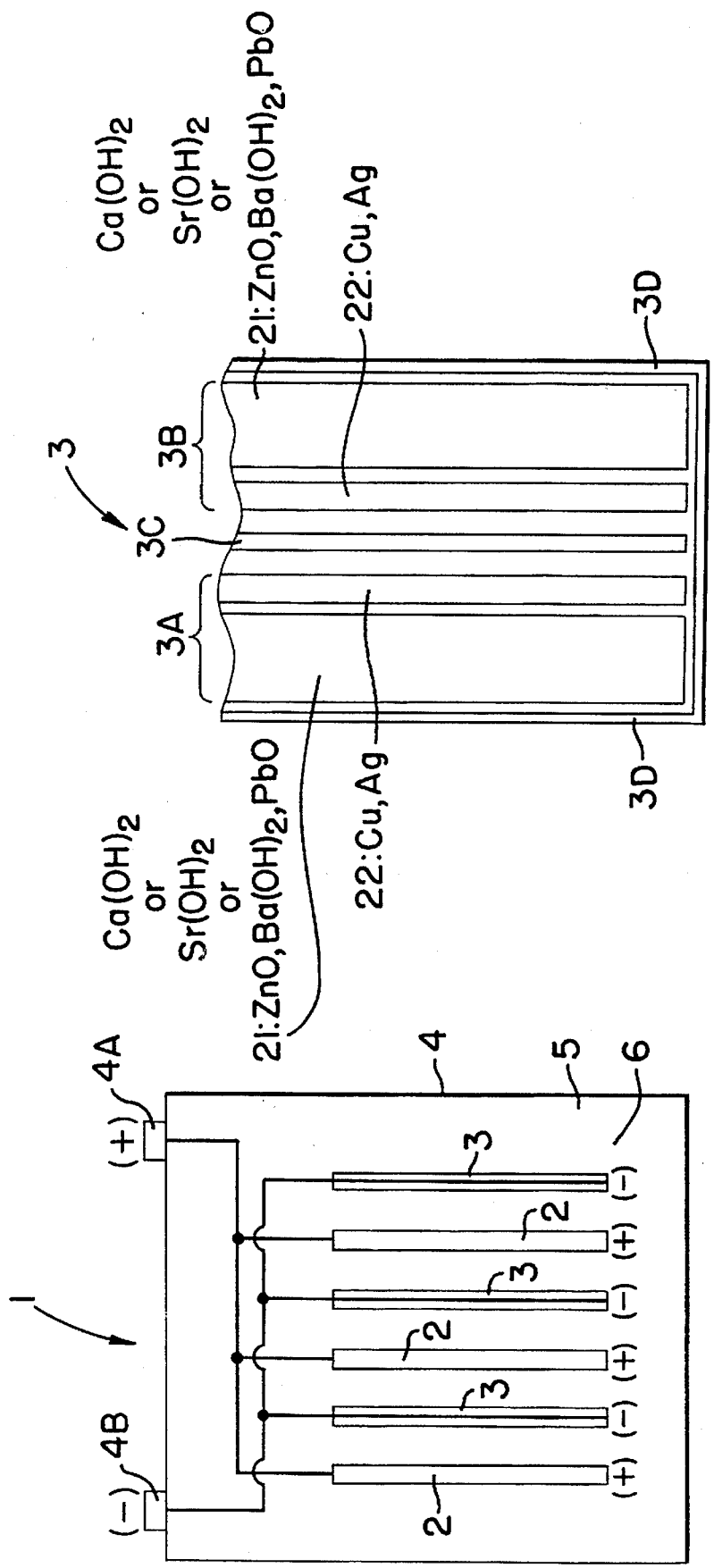

SIMPLIFIED ZINC NEGATIVE ELECTRODE WITH MULTIPLE ELECTRODE ASSEMBLIES

BACKGROUND OF THE INVENTION

This invention relates to rechargeable or secondary batteries and, in particular, to rechargeable or secondary batteries using zinc negative electrodes.

U.S. Pat. No. 5,460,899 and U.S. patent application Ser. No. 08/431,556, now U.S. Pat. No. 5,556,720, assigned to the same assignee hereof, disclose zinc secondary batteries in which the zinc negative electrode is formed from first and second electrode assemblies separated by a porous hydrophobic element. Each electrode assembly includes an active zinc element, comprised of zinc active material, a $Ba(OH)_2$, $Sr(OH)_2$ or $Ca(OH)_2$ material and a conductive matrix formed with a metallic oxide.

Each electrode assembly further includes a metallic current collector abutting the zinc active element and a gas recombination catalytic element formed from a material more electropositive than zinc and having a chemical or electrochemical affinity for reacting with oxygen. The aforesaid gas recombination catalytic element of each electrode assembly abuts the hydrophobic element. The latter element and the electrode assemblies are enveloped by a separator material to complete the electrode.

The aforesaid zinc negative electrode, while advantageous, utilizes many elements, including a gas recombination catalytic element, in each electrode assembly. Accordingly, reducing the number of elements in the zinc electrode would be desirable, both from a fabrication and a cost standpoint.

It is, therefore, an object of the present invention to provide a zinc negative electrode of the above type which is of simpler construction.

It is a further object of the present invention to provide a zinc negative electrode of the above type having a reduced number of elements.

SUMMARY OF THE INVENTION

In accordance with the principles of the present invention, a zinc negative electrode is provided in which the zinc negative electrode includes first and second zinc electrode assemblies separated by a porous hydrophobic element, and in which each of the first and second zinc electrode assemblies has a zinc active element and is devoid of any catalytic material for promoting oxygen gas recombination by the zinc active element.

With this configuration for the zinc negative electrode, it has been found that the space provided by the hydrophobic element itself promotes oxygen gas recombination, without the need of any catalytic material for this purpose. Accordingly, the degree of oxygen gas recombination is not significantly altered, while cost savings are achieved by eliminating the catalytic material.

BRIEF DESCRIPTION OF THE DRAWINGS

The above and other features and aspects of the present invention will become more apparent upon reading the following detailed description in conjunction with the accompanying drawings in which:

FIG. 1 shows a zinc secondary battery employing a zinc negative electrode in accordance with the principles of the present invention; and FIG. 2 shows the zinc negative electrode of the battery of FIG. 1 in greater detail.

DETAILED DESCRIPTION

FIG. 1 shows a sealed zinc secondary battery 1 in accordance with the principles of the present invention. As shown, the battery 1 comprises a plurality of positive electrodes 2 and a plurality of zinc negative electrodes 3 configured in accordance with the principles of the present invention. The positive electrodes 2 and negative electrodes 3 are interleaved with each other and the interleaved arrangement of electrodes is disposed in a sealed container 4 having positive and negative terminals 4A and 4B. The container 4 also holds an electrolyte 5 having an electrolyte constituent 6.

In accordance with the principles of the present invention, each zinc negative electrode 3 is configured as a split electrode so as to provide easier access to the electrodes 3 for the oxygen evolved at the positive electrodes 2 during charge. This enhances oxygen recombination at the zinc electrodes. Specifically, each zinc electrode 3 comprises like electrode assemblies 3A and 3B separated by a porous hydrophobic element 3C. The like electrode assemblies 3A and 3B and the element 3C are shown in more detail in FIG. 2.

As it can be seen, each assembly 3A and 3B comprises an active element 21 which includes a part (e.g., one-half by weight) of the zinc active material (ZnO in the illustrative case), a $Ca(OH)_2$, $Ba(OH)_2$ or $Sr(OH)_2$ material and a metallic oxide material (shown as PbO in the illustrative case) of the electrode. The active element 21 abuts a current collector element 22 comprised of a foil (shown as a copper foil in the illustrative case) plated with a metal (shown as Ag in the illustrative case). The current collector element 22 abuts the porous hydrophobic element 3C. A separator 3D of the electrode 3 envelops the electrode assemblies 3A and 3B and hydrophobic element 3C to complete each electrode 3.

With this construction of each of the electrodes 3 of battery 1, each electrode is found to exhibit enhanced oxygen recombination, without the need for an additional catalytic gas recombination element as taught in the '899 patent. It is believed that the hydrophobic space provided by the hydrophobic element in each electrode itself improves the rate of oxygen gas diffusion to the electrode, thereby providing an enhanced diffusion rate and a resultant increase in the oxygen gas recombination.

Oxygen evolved at the positive electrodes 2 will thus rapidly diffuse through the split electrode assemblies via the porous hydrophobic layers 3C. This also keeps the interior of the electrode assemblies from filling up with electrolyte. The battery 1, therefore, exhibits enhanced gas recombination and is, thus, able to be sealed without venting to prevent electrolyte loss, thereby avoiding the need for maintenance. An overall improved sealed zinc secondary battery is thus realized.

A battery having a substantially similar configuration as the battery described in the Example of the '899 patent, the teachings of which are incorporated herein by reference, except for elimination of the oxygen gas catalytic recombination elements in the zinc negative electrodes, was constructed. This battery delivered 80 percent of original capacity after 600, 80 percent depth of charge cycles.

It should be noted that the metallic matrix of each of the electrode assemblies of the electrodes 3 can be formed of materials similar to those described in the '899 patent. Likewise, the hydrophobic element 3C, electrolyte constituent 6 and positive electrodes 2 can be similar to those described in such patent.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. Apparatus comprising:

at least one zinc negative electrode, said zinc negative electrode including first and second zinc electrode assemblies, each of said first and second zinc electrode assemblies including a zinc active element and being devoid of catalytic material for promoting oxygen gas recombination by said zinc active element; and a porous hydrophobic element situated between said zinc electrode assemblies.

2. Apparatus in accordance with claim 1 wherein:

each zinc electrode assembly further comprises a current collector having a first face abutting the zinc active element of that zinc electrode assembly and a second face abutting said porous hydrophobic element.

3. Apparatus in accordance with claim 2 wherein:

each zinc active element comprises a zinc active material.

4. Apparatus in accordance with claim 3 wherein:

each zinc active element further comprises a metallic oxide which is more electropositive than zinc.

5. Apparatus in accordance with claim 4 wherein:

each zinc active element further comprises one of $Ca(OH)_2$, $Ba(OH)_2$ and $Sr(OH)_2$ material.

6. Apparatus in accordance with claim 5 wherein:

each current collector comprises a copper foil plated with silver; and the metallic oxide of each said zinc active element comprises PbO.

7. Apparatus in accordance with claim 1 wherein:

said one zinc negative electrode further comprises a separator element enveloping said first and second electrode assemblies and said porous hydrophobic element.

8. Apparatus in accordance with claim 7 further comprising:

at least one positive electrode; and a container in which is disposed each said zinc negative electrode and each said positive electrode.

9. Apparatus in accordance with claim 8 further comprising:

an electrolyte disposed is said container.

* * * * *

UNITED STATES PATENT AND TRADEMARK OFFICE
CERTIFICATE OF CORRECTION

PATENT NO. : 5,658,694
DATED : August 19, 1997
INVENTOR(S) : Allen Charkey

It is certified that error appears in the above-identified patent and that said Letters Patent is hereby corrected as shown below:

Title Page, Item[57] Abstract, line 3, delete "element:" and insert -- element. --.

Signed and Sealed this

Third Day of March, 1998

Attest:

BRUCE LEHMAN

Attesting Officer

Commissioner of Patents and Trademarks